Patented July 23, 1946

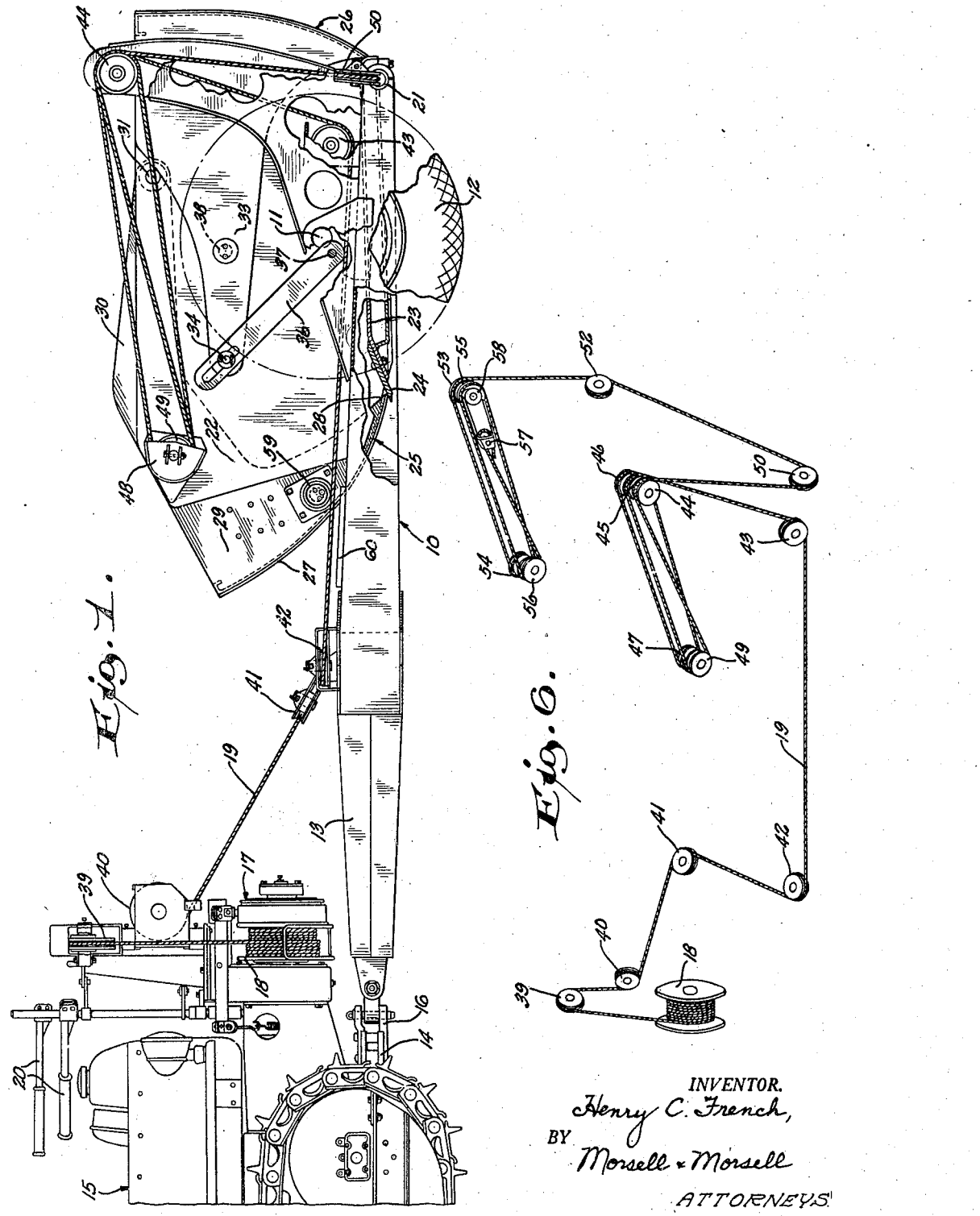

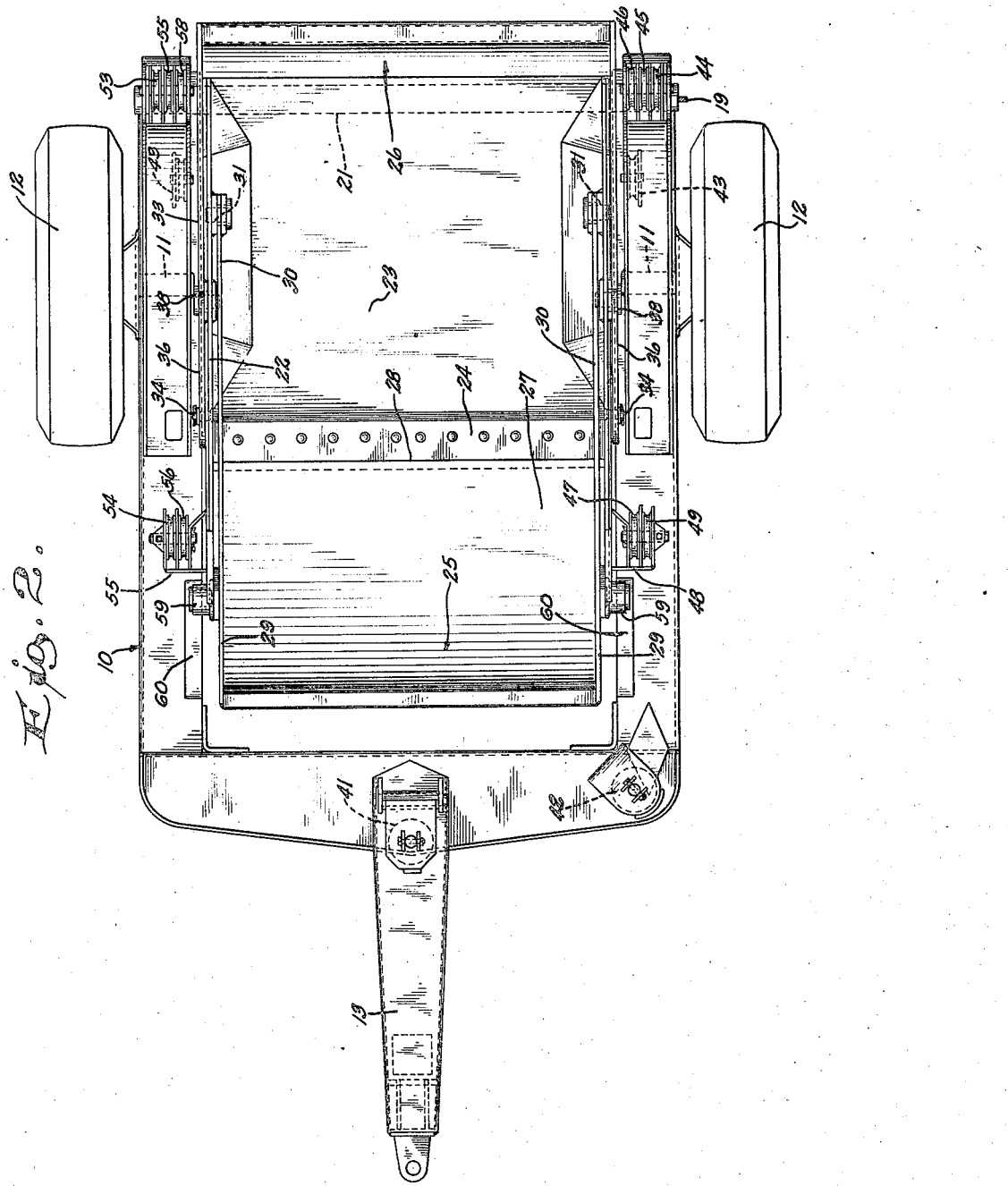

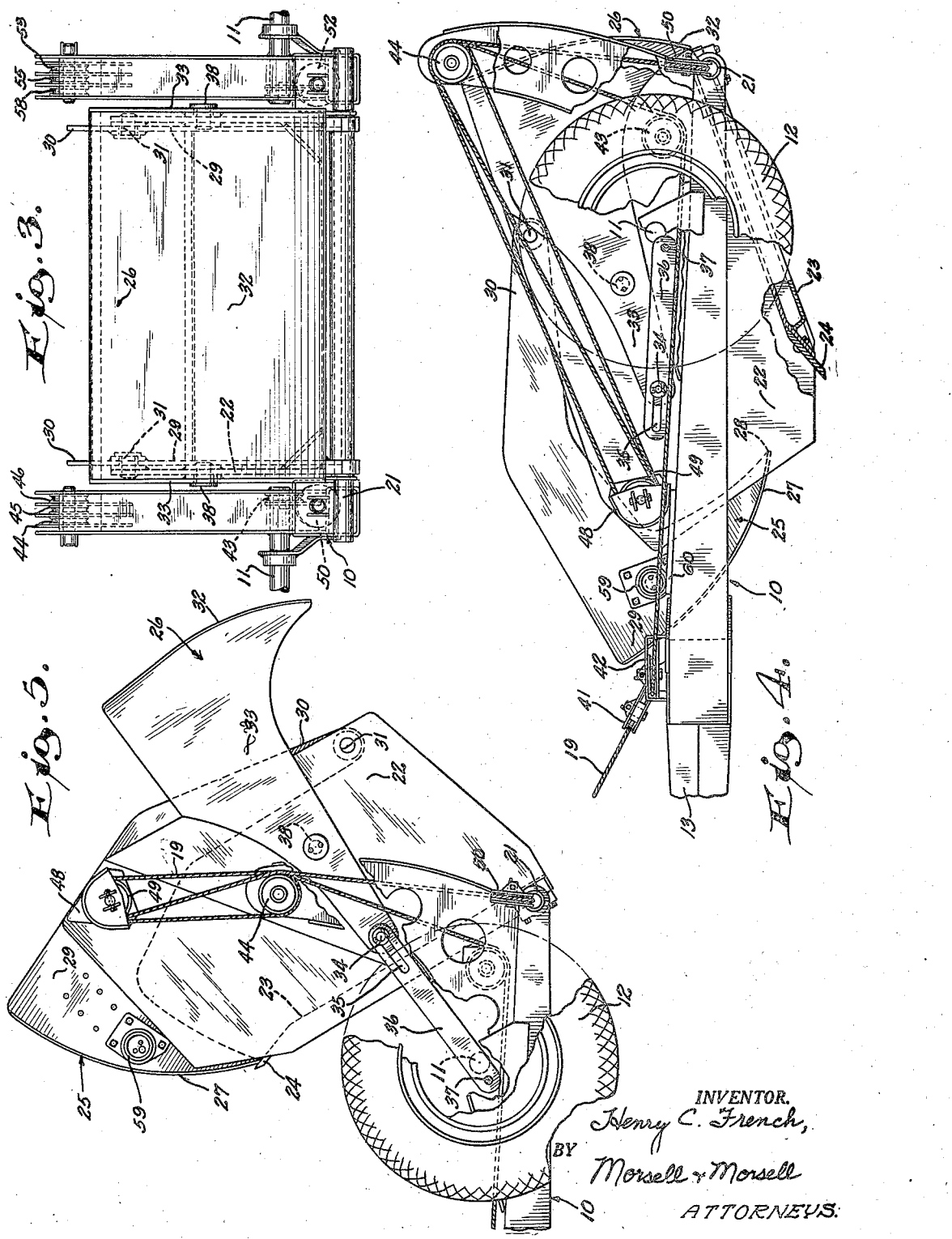

2,404,482

UNITED STATES PATENT OFFICE 2,404,482

TWO-WHEELED CABLE OPERATED REAR DUMP SCRAPER

Henry C. French, Elm Grove, Wis., assignor to The Heil Co., Milwaukee, Wis., a corporation of Wisconsin Application May 25, 1944, Serial No. 537,212

2 Claims. (Cl. 37—133)

This invention relates to improvements in scrapers, and more particularly to a two-wheeled, cable operated, rear dump scraper.

A general object of the invention is to provide a highly efficient and practical two-wheeled scraper arranged for front loading and rear dumping and wherein the scraper mechanism is operated by a single cable, the scraper being operatively associated with a standard crawler tractor and having its cable controlled by the power control unit thereon.

A further object of the invention is to provide a simple, mechanically operating scraper, as distinguished from an intricate hydraulically actuated scraper, susceptible of being readily serviced by the average mechanic.

A further object of the invention is to provide a scraper wherein the bowl and aprons are gravity operated in one direction and cable operated in the other direction.

A more specific object of the invention is to provide a cable operated scraper having incorporated therein a rear transverse tubular frame member which serves the several purposes of forming a transverse tie or connection for the rear portions of the scraper side frames, forming a protecting and guiding sheath for the rear transverse stretch of operating cable, and serving as a pivotal mounting for the scraper bowl.

A further object of the invention is to provide a two-wheeled, cable operated, rear dump scraper which is of relatively simple and inexpensive construction, is strong and durable, is efficient in operation, is easy to control and service, and is well adapted for the purposes described.

With the above and other objects in view the invention consists of the improved two-wheeled, cable operated, rear dump scraper, and its parts and combinations as set forth in the claims, and all equivalents thereof.

In the accompanying drawings in which the same reference characters indicate the same parts in all of the views:

Fig. 1 is a side view of the scraper shown coupled with a tractor and with the scraper bowl and aprons in load-carrying position, portions of the scraper being broken away and in section;

Fig. 2 is a top view of the scraper with the parts in the same position, the operating cable being omitted;

Fig. 3 is a fragmentary rear view of the scraper;

Fig. 4 is a fragmentary side view of the scraper in digging or scraping position, parts being broken away and in section;

Fig. 5 is a fragmentary side view, with parts broken away and in section, of the scraper mechanism in load dumping position; and Fig. 6 is a schematic view of the sheave and single cable arrangement for the operation and control of the scraper bowl and aprons.

Usually, a dig and carry type scraper has forward wheels and rear wheels between which the scraper frame is supported. The forward end of the scraper is attached to the draw bar of a tractor and the mechanism of the scraper is controlled by the driver of the tractor. The present construction is more compact, less expensive and possesses greater maneuverability than that described because the usual forward wheeled support for the scraper is eliminated and the forward end of the scraper is supported directly by the tractor. By this arrangement the substantial crawler mechanism of the tractor is brought into action to support a large portion of the weight of the scraper and its load. The present arrangement is also highly suited for a rear dumping bucket construction, which has operational advantages.

Referring now more particularly to the drawings the improved scraper shown therein by way of illustration, comprises a sturdy open frame 10 of rectangular contour with the side members thereof carrying, toward their rear ends, axles 11 on which are mounted wheels 12. A connecting arm 13 is rigidly connected to the front transverse member of said frame 10, intermediate the sides, and the same projects forwardly horizontally and is universally movably engaged with the draw bar 14 of a crawler tractor 15 by a conventional hitch mechanism 16. On the rear of the tractor is mounted a power control unit 17 which includes a cable winding drum 18 on which a single scraper mechanism operating and control cable 19 is adapted to be wound and unwound. The power control unit 17 includes forwardly projecting control levers 20 whereby the tractor operator may control the scraper mechanism from the driver's seat on the tractor.

A highly advantageous feature of the invention, as will appear more fully hereinafter, is a transverse tubular member 21 which forms the rear cross element of the frame 10 and which serves several functions. Said member 21 is extended between the rear ends of the sides of the frame 10 and is rigidly attached thereto. For one thing the transverse tubular member 21 serves as a pivotal mounting for the rear lower end portion of a bowl 22. The latter includes spaced vertical side plates and an integral, heavy bottom 23 carrying at its free forward edge an angularly disposed, transverse scraper blade 24. The bowl is open at its front and rear ends, the former for loading and the latter for dumping. Said open bowl ends are, however, controlled by pivotally mounted front and rear aprons 25 and 26 respectively.

The front apron 25 comprises a curved, load-confining plate 27 terminating in an edge 28 adapted to seat on the top surface portion of the blade 24 when the bowl is in closed, load-carrying condition. The apron 25 is completed by side plates 29 formed with rearwardly extending, angular arms 30 which interiorly lap inner surface portions of the bowl side plates and have their rear extremities pivotally secured thereto, as at 31.

The rear apron 26 similarly comprises a curved, load-confining plate 32 whose free edge is adapted, under certain conditions, to abut the rear portion of the bowl and to close the same, in addition to spaced side plates 33 whose free extremities form arms which are pivotally and slidably connected, as at 34, with the adjacent slotted portions 35 of links 36. The other ends of the links 36 are, in turn, pivotally mounted, as at 37, on portions of the frame. Intermediate portions of the side plates or arms of the rear apron 26 are also pivotally mounted on outer surface portions of the sides of the bowl, as at 38. Therefore, the mounting of the rear apron and the arrangement of the links 36 is such that when the bowl is upwardly rearwardly tilted from its carrying position of Fig. 1 to its dumping position of Fig. 5, said apron is swung to an elevated position opening the rear of the bowl.

The sheave and single cable lacing arrangement for the scraper will now be described. From Fig. 1 it will be evident that the forward end of the cable 19 is secured to and is adapted to be wound and unwound relative to the winch drum 18. From the drum 18 the cable is extended over and about the pulleys 39 and 40 of a fairlead device associated with the tractor borne power control unit. Mounted on the inner end of the frame forward connecting arm 13, and at an angle, is a sheave 41 which is engaged by the cable and which then directs the cable laterally to a sheave 42 at the forward end of one side of the scraper frame 10. From the sheave 42 the cable extends longitudinally rearwardly along said side of the frame, ultimately engaging a sheave 43 which is mounted on a frame-carried bracket and on a horizontal axis, said bracket being at the rear of said side of the frame. Disposed on a frame-carried bracket substantially above the sheave 43 is a series of alined but independent sheaves 44, 45 and 46. The innermost of said sheaves, i. e. sheave 46, is engaged by the cable from whence the cable is forwardly directed on the first-mentioned side of the scraper and is extended about a sheave 47 which constitutes one of a pair mounted on a horizontal axis journalled in a bracket 48 which is mounted on an upper forward outer side portion of the bowl. From the sheave 47 the cable is then brought rearwardly and engages the intermediate sheave 45 of the group previously mentioned and then is brought forwardly about an outer sheave 49 which is carried by the previously mentioned bracket 48. From the sheave 49 the cable is extended rearwardly to the upper outer sheave 44 and then downwardly to a sheave 50 on the same side of the frame but immediately adjacent the transverse frame tube 21. Said sheave 50 permits the cable to then be guided into and through the tubular member 21 and the cable passes out of the opposite end of the tubular member, engaging a lower rear sheave 52 on the opposite side of the scraper frame which then permits the cable to be directed upwardly to pass over a sheave 53 which is the outermost sheave of a group of alined sheaves carried by an upwardly projecting frame anchored element on the side of the frame under consideration. From the sheave 53 the cable extends forwardly to the outermost sheave 54 of a pair of upper forward sheaves, both of which are mounted in a bracket 55 carried by an upper forward portion of said side of the scraper bowl. From the sheave 54 the cable extends rearwardly to an intermediate upper rear sheave 55 and then forwardly to an upper forward sheave 56 which is companion to the sheave 54 and which is carried by the bracket 55. Then the cable is again directed rearwardly and is dead-ended, as at 57, to an upper rear sheave 58.

It will be apparent that the transverse tubular frame member 21, besides acting as a pivotal mounting for the scraper bowl 22, forms a transverse rigid tie or connection between the rear ends of the sides of the scraper frame 10. Another important function of said member is that it provides a protecting and guiding sheath for the rear transverse stretch of the operating cable 19.

From the foregoing description the operation of the scraper, which is of the dig and carry type, is no doubt obvious. When the assemblage is in the position illustrated in Fig. 4 and the scraper is being advanced along the ground, the blade or scraping edge 24 engages the ground to the proper depth and the material will enter the load-confining space within the bowl and will pile up upon the bottom plate 23 thereof and against the sidewalls of the bowl. In this position the rear apron 26 is in a position so as to close the rear of the bowl and dirt or material is thereby prevented from spilling out rearwardly. The front apron 25 cannot drop below the position illustrated in Fig. 4 because rollers 59 carried thereby engage plates 60 on the side portions of the scraper frame. This relationship therefore provides a proper loading or digging opening as between the lowered blade 24 and the free edge 28 of the front apron. The front apron does serve, in this relationship, to confine accumulated material within the load-confining zone.

When the load-confining zone, defined by the bucket and front and rear aprons has been sufficiently filled with material the bucket should be raised to the carrying or transporting position illustrated in Fig. 1, whereupon the edge of the blade 24 is brought into contact with the edge portion 28 of the front apron. The scraper with its confined load may then be transported over ground without permitting escape of any of the material until it becomes desirable to discharge the load through the rear of the bowl. The latter position is shown in Fig. 5 wherein the bowl is tilted upwardly rearwardly and the rear apron is, through the means previously described, swung upwardly to expose the rear end of the bowl.

The movement of the bowl 22 to and from the several positions described and the consequent movement of the aprons is controlled solely by the single cable 19 whose lacing arrangement has previously been described. When the cable is played out and the parts are to be lowered the operation is by gravity in the down direction and the winding up of the cable by the power control unit effects a pull to move the bowl and its connected parts in the other direction. For instance, to attain the digging position illustrated in Fig. 4 it is only necessary to play out the cable and the bowl will drop to the position of Fig. 4 with the rear apron being actuated by gravity to continue to close the rear end of the bowl. In thus dropping, the bowl moves away from the front apron whose downward movement is limited by the rollers 59 and frame carried plates 60.

If the bowl is to be raised from the digging position of Fig. 4 to the carrying or load transporting position of Fig. 1 the power control unit 17 is operated to wind up or pull in on the single cable 19 whereupon the front end of the bowl, in being elevated, will contact the lower edge 28 of the front apron, carrying the apron with it to the load transporting position. Gravity continues to hold the rear apron in closing relation to the rear end of the bowl.

For dumping the load, a further taking in or pull on the cable, through operation of the power control unit, first elevates the bowl upwardly rearwardly toward the dumping position of Fig. 5, with the bowl pivoting on the tubular member 21. Continued pull on the cable causes the links 36 to swing and take effect as against the arm portions 33 of the rear apron 26, whereupon said rear apron will be swung or tilted upwardly, exposing the rear end of the tilted bowl, allowing the load to dump.

From the foregoing detailed description it will be apparent that a very simple and effective form of two-wheeled, cable operated, rear dump scraper has been provided. The scraper mechanism efficiently loads and confines the material and can then be operated to discharge and spread the same. All of the operations of the machine may be quickly and effectively accomplished with the aid of a single cable which is under the control of the operator of the tractor to which the scraper is hitched. The simple mechanism features of the scraper make it susceptible of easy servicing by an average mechanic. The two-wheeled construction of the scraper reduces the cost of the same and permits a substantial portion of the scraper and its load to be borne by the sturdy tractor. The improved scraper is further of simple and novel construction, is easily operated, and is well adapted for the purposes described.

What is claimed as the invention is:

1. In combination, a tractor equipped with a power control unit, a scraper frame supported at its forward end by the tractor and including a rear transverse tubular member, a pair of wheels supporting the rear end of the frame, a bowl open at both ends and pivotally mounted at its rear end on said rear transverse tubular member, front and rear aprons pivotally associated with the bowl and controlling the front and rear ends thereof, a series of spaced sheaves carried by the scraper frame and bowl, and a single control and operating cable anchored at its outer end to a portion of the frame and having its other end engaging said power control unit to be pulled in or played out thereby, intermediate portions of the cable being guidingly engaged by said sheaves and an intermediate stretch of said cable being passed through said transverse tubular member.

2. In a dig and carry scraper mechanism, a two-wheeled frame including a rear transverse tubular member, a bowl open at both ends and pivotally mounted at its rear end on said rear transverse tubular member, front and rear aprons pivotally associated with the bowl and controlling the front and rear ends thereof, a series of spaced sheaves carried by the scraper frame and bowl, and a control and operating cable anchored at its outer end to a portion of the frame and having its other end adapted to be pulled in or played out for operating purposes, intermediate portions of the cable being guidingly engaged by said sheaves and an intermediate stretch of the cable being passed through said transverse tubular member.

HENRY C. FRENCH.